United States Patent Office 3,485,870
Patented Dec. 23, 1969

3,485,870
HALOGEN OXIDES, HALOGEN OXY ACIDS, AND SALTS THEREOF AS SULFOXIDATION PROMOTERS
Howard W. Bost, Bartlesville, Okla.
(% Phillips Petroleum Co.)
No Drawing. Filed Apr. 11, 1966, Ser. No. 541,518
Int. Cl. C07c 143/02
U.S. Cl. 260—513                               8 Claims

ABSTRACT OF THE DISCLOSURE

Organic compounds containing hydrocarbon linkages are sulfoxidized in the presence of a sulfoxidating agent comprising sulfur dioxide and oxygen and a sulfoxidation initiator comprising ozone, peroxides, hyperoxides, and active radiation, and reaction promoting compounds comprising halogen oxides, halogen oxy acids and salts of such oxy acids.

---

This invention relates to the preparation of sulfonic acids. In accordance with one aspect, this invention relates to a process for sulfoxidizing organic materials, and particularly for the preparation of sulfoxidized organic compounds through the reaction of organic feedstocks with a sulfoxidizing agent, a reaction initiator, and a sulfoxidation promoter. In accordance with another aspect, this invention relates to the production of sulfoxidized hydrocarbon compounds through the treatment of hydrocarbon feedstocks with sulfur dioxide and oxygen, a sulfoxidation initiator and a reaction promoter selected from halogen oxides and halogen oxide ions.

The sulfoxidation of organic compounds has been extensively investigated, and is known in the art that sulfoxidized hydrocarbon compounds can be obtained by treating hydrocarbon feedstocks with sulfur dioxide and oxygen in the presence of various reaction initiators such as ultraviolet light, peroxides, and ozone. However, the amounts of these initiators generally required to obtain substantial conversion in a reaction of economically feasible holding time are considerable. The intensity of the actinic radiation required to obtain substantial conversion in sulfoxidation processes initiated by ultraviolet light are quite high, and further, in such processes, contacting problems are prominent due to the physical nature of the initiator. Further, the yields from ozone initiated sulfoxidation reactions are not sufficiently high to warrant ready acceptance of such a process for commercial use.

In accordance with the present invention, halogen oxides, halogen oxy acid, and salts of such oxy acids, have found quite effective for increasing the yields of sulfonic acid per unit of time in an ozone initiated sulfoxidation reaction.

Accordingly, it is an object of this invention to provide novel promoters or catalysts for the ozone-oxygen sulfoxidation of organic materials.

A further object of this invention is to provide an improved process for the conversion of saturated hydrocarbons to sulfonic acids in increased yields.

Another object of this invention is to provide a commercially feasible and acceptable ozone-initiated sulfoxidation process.

Other aspects, objects, and several advantages of this invention will be apparent to one skilled in the art from a reading of this disclosure and the appended claims.

In accordance with this invention, the rate of sulfoxidation of organic compounds is greatly improved by carrying out the reaction in the presence of a reaction promoting compound selected from halogen oxides, halogen oxy acids, and salts of such oxy acids, preferably alkali metal salts.

Further, in accordance with the process of this invention, the rate of sulfoxidation of organic compounds, particularly saturated hydrocarbon compounds, in the presence of a sulfoxidizing agent and in the presence or absence of a sulfoxidation initiating agent is greatly improved by adding to the reaction mixture a compound selected from halogen oxides and anions of halogen oxy acids as promoters in the sulfoxidation reaction.

More specifically, according to the process of this invention, the sulfoxidation of a mixture of organic compounds comprising, primarily, saturated hydrocarbons in the presence of sulfur dioxide and oxygen, and a reaction initiating agent such as ozone, peroxides, hydroperoxides, and/or actic radiation is substantially improved through the use of at least one promoting agent selected from the halogen oxides defined herein.

As described above, the reaction catalysts or promoters which are to be employed in the sulfoxidation reaction of this invention are halogen-oxygen compounds, oxides preferably of chlorine, bromine, and iodine, as well as acids derived from these halogens and salts of these acids. The oxy acids of the halogens and the salts thereof are preferably those compounds wherein the valence for the halogen is 5 or 7.

Representative examples of suitable halogen-oxygen compounds that can be employed according to the invention include: chlorine monoxide ($Cl_2O$), chlorine dioxide ($ClO_2$), chlorine hexoxide ($Cl_2O_6$), chlorine heptoxide ($Cl_2O_7$), bromide dioxide ($BrO_2$), iodine pentoxide ($I_2O_5$), perchloric acid, bromic acid, iodic acid, sodium perchlorate, potassium bromate, sodium iodate, potassium periodate, and the like.

The process of the present invention is carried out by contacting a saturated hydrocarbon with $SO_2$ and oxygen, preferably in the presence of ozone as a reaction initiator and one of the above-defined catalysts. The chosen hydrocarbon to be sulfoxidized and thus converted to sulfonic acids will depend, to a great extent, on the desired use of the product sulfonic acids. Any saturated hydrocarbon aliphatic in character, i.e., any saturated aliphatic or cycloaliphatic hydrocarbon, can be employed in this sulfoxidation reaction to form sulfonic acids. This category includes saturated aliphatic straight chain and branched chain hydrocarbons as well as saturated alicyclic hydrocarbons. Generally speaking, hydrocarbons containing from 1 to 24 carbon atoms, preferably 4 to 20 carbon atoms, will be converted to the corresponding sulfonic acids by this process. As indicated above, the process of the invention is applicable for the sulfoxidation of both branched chain and straight chain alkanes, but it is preferred to utilize straight chain alkanes in this process, as the sulfonic acids which are produced have utility in the detergent area. By employing a straight chain alkane, the produced sulfonic acids having wetting properties are also degradable by bacterial action.

Some examples of saturated aliphatic or cycloaliphatic hydrocarbons which can be sulfoxidized by the process of this invention are: methane, ethane, butane, isobutane, n-hexane, isooctane, n-decane, n-dodecane, n-pentadecane, n-hexadecane (cetane), n-tetraeicosane, cyclohexane, cyclodecane, decalin, n-eicosane, and the like.

The process of this invention is carried out at a temperature generally ranging from 0–75° C., preferably below 50° C., and still more preferably between 15 and 30° C. The color of the produced sulfonic acids is improved by operation at lower temperatures, but at these lower temperatures the rate of sulfoxidation decreases significantly, and significant amounts of peroxide appear in the product. If desired, actinic light, peroxides, hydroperoxides, or ozone can be used as the reaction initiator. Ozone is presently preferred.

In the sulfoxidation reaction, the mole ratio of $SO_2/O_2$ should be at least 1/1, but it is preferred to utilize an excess of $SO_2$. Thus, the mole ratios of $SO_2/O_2$ can range as high as 2.5–3.0/1, but it is preferred to operate at about 10 percent excess $SO_2$. The reaction is conveniently carried out by charging the hydrocarbon to be sulfoxidized to the sulfoxidation reactor along with the catalyst to be employed. Following this, $SO_2$, oxygen and ozone, or other reaction initiators, are then passed into the reactor in the desired amount, utilizing a sufficiently high feed rate of $SO_2$ so as to maintain the concentration of dissolved $SO_2$ in the hydrocarbon at saturation. The $SO_2$, oxygen and ozone, or other reaction initiator, can be passed to the reactor in single streams or in a mixed stream, or in any combination of mixed streams. In a preferred embodiment, it is most convenient to pass the oxygen stream through an ozonator so as to form the desired amount of ozone and then pass this mixture of ozone and oxygen directly into the reactor, either per se or in admixture with the $SO_2$. The thus-formed sulfonic acids separate out at the bottom of the sulfoxidation reactor. This material can be drawn off continuously or intermittently as desired. The amount of ozone in the oxygen-ozone mixture will generally range from about 0.1 weight percent to about 10 weight percent, and if they are supplied in separate streams, the relative amounts employed will be within the same range.

The amount of halogen oxide applied as catalyst for the reaction can vary over a wide range. Generally, the amount of supplied halogen oxide will range up to 5 weight percent of the hydrocarbon charge of at least one of the halogen oxide promoters dissolved, say, in a small amount of water, e.g., 1 to 10 ml. per liter of charge.

As another advantage of this process, it was described above that lower temperatures lead to alkanesulfonic and cycloalkanesulfonic acids of improved color. When operating in the preferred temperature range, the produced sulfonic acids are colored to some extent ranging from a light yellow to black in the case of high temperature reactions. The use of ozone as the reaction initiator has the dual benefit of effecting some decolorizing of this material. It is also within the scope of this invention to further treat the produced sulfonic acids with ozone after removal of the sulfonic acids from the sulfoxidation reactor.

The sulfonic acids which are produced by the process of this invention can be converted to the corresponding alkali metal or ammonium salts and utilized directly as wetting agents, emulsifiers and detergents.

EXAMPLE I

A series of runs was carried out in which n-dodecane, a typically representative alkane, was converted to dodecane sulfonic acid by sulfoxidation with $SO_2$ and oxygen in the presence of ozone and in the presence of a halogen oxide of this invention. After the base level of the reaction had been established, the catalyst was introduced and the reaction rate compared with the base rate.

In these runs, 2700 ml. of n-dodecane was charged to a 3-liter reaction vessel which comprised a glass reactor having an enlarged bottom of approximately 1 liter capacity and a 4 inch diameter upper section having approximately a 2 liter capacity. Two fritted sparge tubes were mounted just above the enlarged section with $SO_2$ feeding one frit and an oxygen-ozone mixture feeding the other frit. The reaction was carried out by passing .04 cubic feet per minute of oxygen containing 65–75 milligrams of ozone per liter in the one frit and simultaneously passing 0.44 cubic feet per minute of $SO_2$ into the other frit. The reaction was continued for several hours to obtain a base level for productivity of dodecane sulfonic acid in grams per hour. Product dodecane sulfonic acid was drawn off intermittently from the bottom of the reactor, and makeup dodecane was added to maintain the dodecane level in the reactor at 2500–2700 ml. By measurement of the amount of dodecane sulfonic acid drawn off, the productivity level was determined. When this productivity level had stabilized, the candidate catalyst was charged to the reactor. The run was continued, and the productivity level was again determined over a several hour period.

The results of these runs are shown in Table I.

TABLE I

| Run No. | Catalyst | Amount of Catalyst[1] | Baseline productivity rate, g./hr. | Temperature, °C. | Productivity rate, g./hr. |
|---|---|---|---|---|---|
| 1 | $HClO_4$ | 2 ml. 70% $HClO_4$ | 108 | 14.23 | 235 after 0.25 hr. Average 170 after .5 hr. |
| 2 | $HIO_3$ | 2 g./2 ml. $H_2O$ | 99 | 16.17 | 175 after 1 hr. |
| 3 | $KBrO_3$ | 2 g./3 ml. $H_2O$ | 118 | 14–17 | 144 after 1 hr. |

[1] 2–3 liter n-dodecane were initially charged to the reactor.

It will be observed from the preceding table that a substantial improvement in productivity was realized with the catalyst of the invention. It will be noted from the table that the reaction rate is increased 20–100 percent by use of the halogen-oxygen compounds of the invention.

Reasonable variation and modification are possible within the scope of the foregoing disclosure and the appended claims to the invention, the essence of which is there is provided a process for sulfoxidation of organic compounds, preferably saturated hydrocarbon materials, in the presence of a sulfoxidizing agent such as a mixture of sulfur dioxide and oxygen, and further in the presence of a sulfoxidation initiator, particularly ozone, and a promoting amount of a promoter selected from halogen oxides, halogen oxy acids, and salts of such oxy acids.

I claim:
1. A process for the production of sulfonic acids which comprises contacting (a) an organic material containing saturated hydrocarbon linkages selected from alkane and cycloalkane hydrocarbons containing from 1–24 carbon atoms per molecule, with (b) a sulfoxidizing agent comprising sulfur dioxide and oxygen and a sulfoxidation initiator comprising at least one of peroxides, hydroperoxides, ozone and actinic radiation in the presence of (c) a promoting amount of at least one promoter selected from halogen oxides, halogen oxy acids wherein the halogen has a valence of 5 or 7, and alkali metal salts of such halogen oxy acids, and wherein the halogen is chlorine, bromine, or iodine.

2. A process according to claim 1 wherein said reaction initiator is ozone.

3. A process according to claim 1 wherein the temperature of said reaction ranges from 0–75° C.

4. A process according to claim 2 wherein said organic material is an alkane containing from 4–20 carbon atoms and wherein a mixture of ozone and oxygen is used, which mixture contains from 0.1 to 10 weight percent ozone.

5. A process according to claim 1 wherein the amount of promoter present ranges up to 5 weight percent of the hydrocarbon charge during said contacting.

6. A process according to claim 1 wherein (a) is n-dodecane, (b) is $SO_2$, oxygen and ozone, and (c) is perchloric acid.

7. A process according to claim 1 wherein (a) is n-dodecane, (b) is $SO_2$, oxygen and ozone and (c) is potassium bromate.

8. A process according to claim 1 wherein (a) is n-dodecane, (b) is $SO_2$, oxygen and ozone, and (c) is iodic acid.

References Cited

FOREIGN PATENTS 238,689  12/1945  Switzerland.

OTHER REFERENCES

Orthner, Agnew., Chem. 62, 302–305 (1950).

DANIEL D. HORWITZ, Primary Examiner

U.S. Cl. X.R.

204—163; 260—503